US005988732A

United States Patent [19]

Schouten

[11] Patent Number: 5,988,732

[45] Date of Patent: Nov. 23, 1999

[54] FLATBED TRAILER ENCLOSURE

[76] Inventor: Ben H. Schouten, 393 Greens Rd., R.R. #2, Caledonia, Ontario, Canada, N0A 1A0

[21] Appl. No.: 08/963,246

[22] Filed: Nov. 5, 1997

[51] Int. Cl.[6] ..................... B60J 7/00

[52] U.S. Cl. ..................... 296/181; 296/36; 296/100.09; 296/100.1

[58] Field of Search ..................... 296/181, 183, 296/36, 100.09, 100.1, 147

[56] References Cited

U.S. PATENT DOCUMENTS

| | | | |
|---|---|---|---|
| 4,210,358 | 7/1980 | Sweet et al. | 296/100 |
| 4,268,084 | 5/1981 | Peters | 296/148 |
| 4,627,658 | 12/1986 | Vold et al. | 296/100 |
| 4,673,208 | 6/1987 | Tsukamoto | 296/98 |
| 4,842,323 | 6/1989 | Trickett | 296/98 |
| 5,186,231 | 2/1993 | Lewis | 160/310 |
| 5,190,341 | 3/1993 | Simard | 296/100 |
| 5,271,336 | 12/1993 | Willetts | 105/377 |
| 5,328,228 | 7/1994 | Klassen | 296/98 |
| 5,498,057 | 3/1996 | Reina et al. | 296/100 |

*Primary Examiner*—Joseph D. Pape
*Assistant Examiner*—Mickki D. Murray
*Attorney, Agent, or Firm*—Ridout & Maybee

[57] ABSTRACT

A flatbed trailer enclosure comprising an upright frame member having a lower portion adapted for securing to a top surface of a flatbed trailer, and a pair of side frame members pivotally mounted to the upright frame member. A pair of actuators are provided for rotating the side frame members, one being directly coupled to a drive shaft, and the other having a reversing gear coupled to the drive shaft. Each actuator has an output shaft coupled to a respective side frame member.

22 Claims, 8 Drawing Sheets

FLATBED TRAILER ENCLOSURE

FIELD OF THE INVENTION

This invention relates to a flatbed trailer enclosure, and more particularly to a flatbed trailer enclosure for transporting sod.

BACKGROUND OF THE INVENTION

FIG. 1 depicts a known flatbed trailer 10 of the type typically used for transporting sod. A tarpaulin 12 is stored in a storage compartment 14 at the front of the trailer 10. The sod is loaded by forklift onto the loading surface 16 of the trailer 10. The tarpaulin 12 is then pulled manually rearwards from the storage compartment 14 across the uppermost portion of the sod pile. The tarpaulin 12 is then secured to the trailer 130 by elastic cords 18.

A principle disadvantage of known flatbed trailer enclosures, such as the enclosure shown in FIG. 1, is that the step of extending and securing the tarpaulin 12 to the trailer 10 is labour-intensive. The tarpaulin 12 must be pulled manually rearwards from the storage compartment 14 across the sod pile without damaging the sod. Once the tarpaulin 12 is fully extended, it must be secured to the flatbed trailer 10 through numerous elastic cords 18, while maintaining the tarpaulin 12 in position. Prior to unloading the sod, the elastic cords 18 must be removed and the tarpaulin 12 safely stored out of the way in the storage compartment 14 to avoid being damaged by the forklift.

Another disadvantage of known flatbed trailer enclosures is that the sod is not firmly held on the loading surface 16 of the flatbed trailer 10. As the tarpaulin 12 is only held in place by elastic cords 18, any lateral shifting of the sod on the flatbed trailer 10 can cause the elastic cords 18 to snap, and the sod to fall off the flatbed trailer 10. Similarly, any damage done to the tarpaulin 12 during the loading or unloading process can cause the tarpaulin 12 to tear, thereby allowing the sod or sod debris to fall off the flatbed trailer 10.

Various mechanisms for automatically enclosing trailers are known. Both U.S. Pat. No. 4,627,658 to Vold and U.S. Pat. No. 4,210,358 to Sweet teach an open-top trailer top-cover comprising a pair of panels rotatably mounted to the top of the trailer. Each panel is opened and closed by a rotating arm driven by a motor. However, the cost of adapting these implementations for the transportation of sod rolls on a flatbed trailer would be particularly high because a separate motor would be required for each panel. U.S. Pat. No. 5,498,057 to Reina teaches a retractable trailer cover comprising arch-like channels that support opposite ends of a tarpaulin, and a plurality of sprockets and endless chains for moving the tarpaulin, all driven by a single motor. Although cheaper to implement than a two-motor configuration, the single motor configuration disclosed by Reina would not allow both sides of the trailer cover to be closed simultaneously.

Accordingly, there remains a need for a flatbed trailer enclosure which is suitable for transporting sod.

SUMMARY OF THE INVENTION

According to the invention, a flatbed trailer enclosure comprises:

- an upright frame member having a lower portion adapted for securing to a top surface of the flatbed trailer;
- a pair of side frame members, each side frame member being pivotally mounted to the upright frame member;
- a drive shaft having a drive input;

- a first actuator for rotating one of the side frame members, the first actuator being coupled to the drive shaft and having an output shaft coupled to the side frame member; and
- a second actuator for rotating the other side frame member, the second actuator having a reversing gear coupled to the drive shaft, and an output shaft coupled to the reversing gear and to the other side frame member.

Preferably, the velocity ratio of one of the actuators is at least 1:1, and the velocity ratio of one of the actuators is substantially equal to the velocity ratio of the other actuator.

BRIEF DESCRIPTION OF THE DRAWINGS

Reference will now be made to the accompanying drawings which show, by way of example, a preferred embodiment of the invention, and in which.

DESCRIPTION OF THE PREFERRED EMBODIMENT

Figure 1:
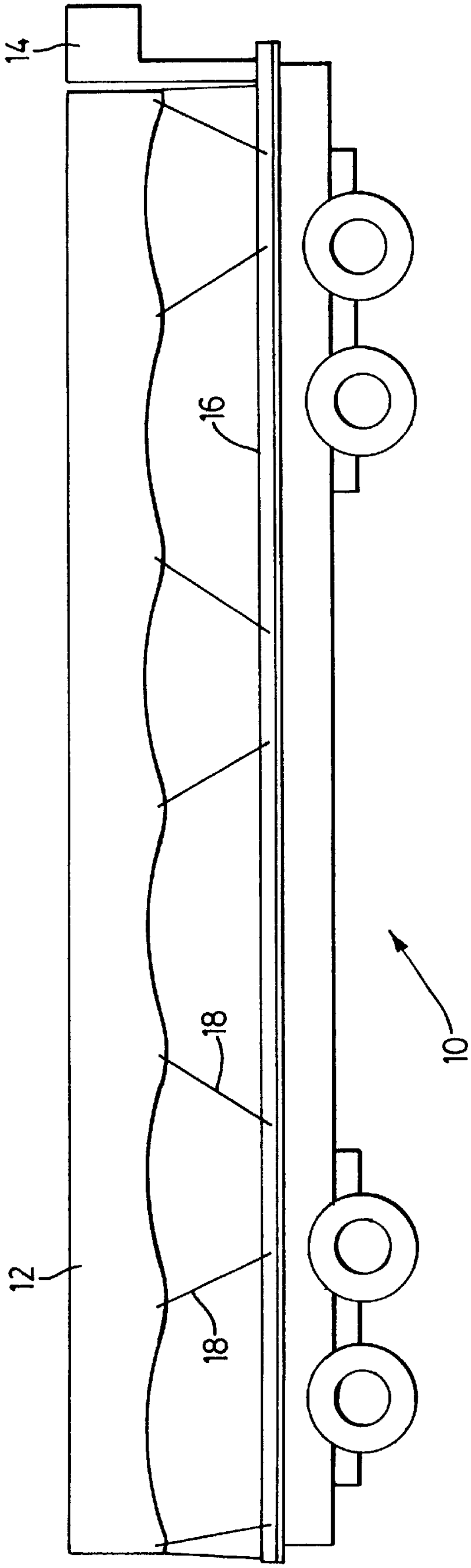
FIG. 1 is a side view of a flatbed trailer enclosure used for transporting sod, according to the prior art.

In FIGS. 2 to 10, like reference numerals indicate like elements.

Figure 2:
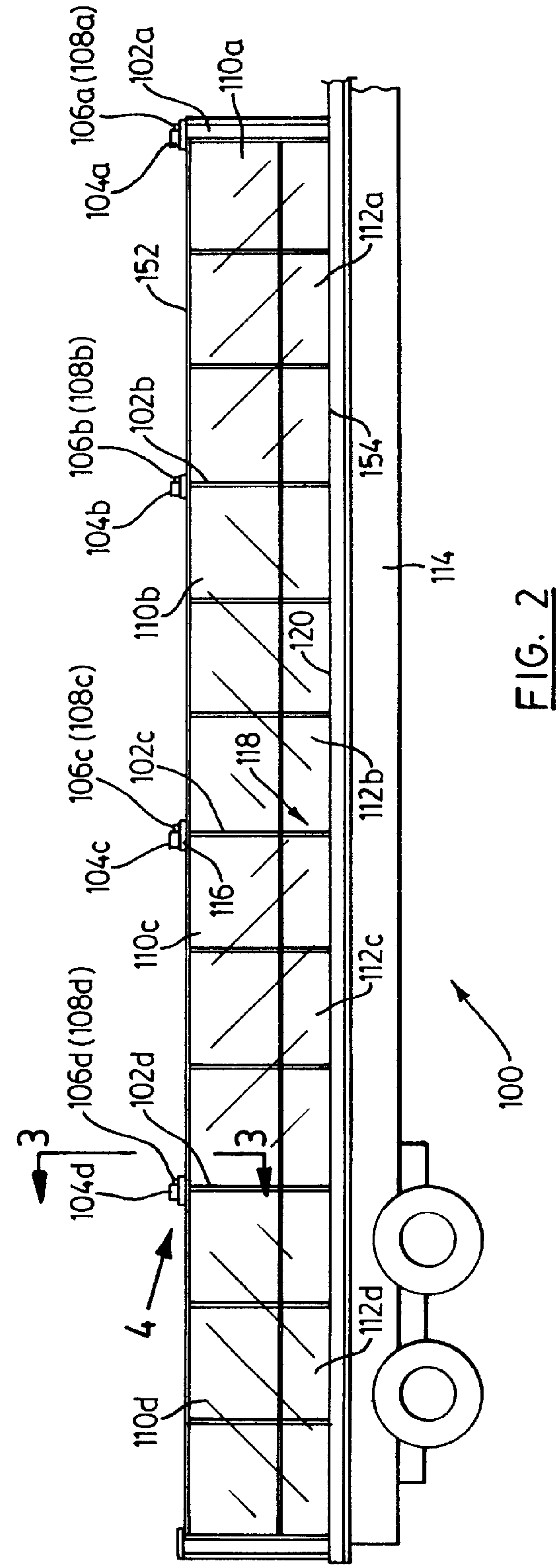
FIG. 2 is a side view of the flatbed trailer enclosure according to the present invention.
Figure 3:
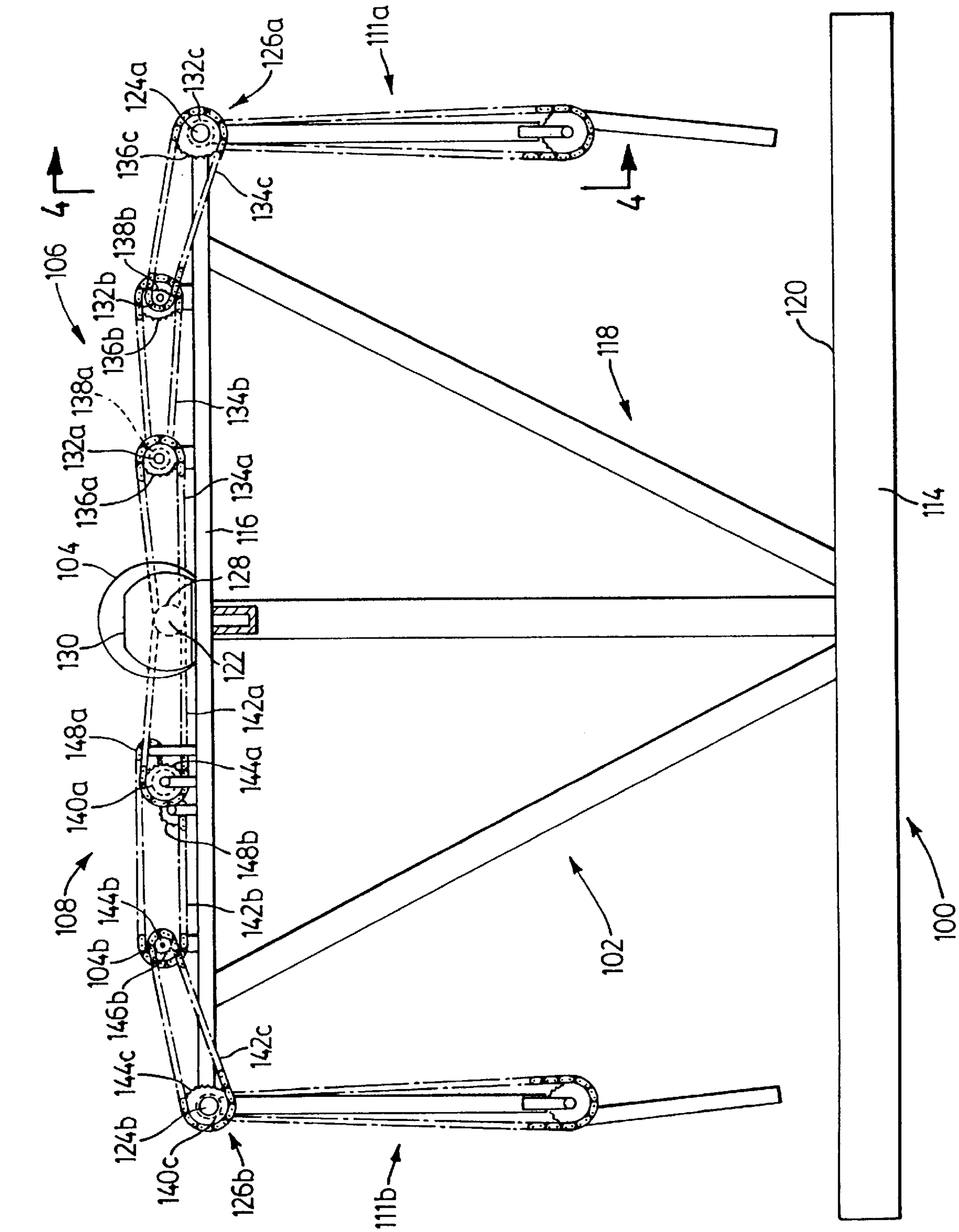
FIG. 3 is a sectional view taken along the line 3—3 of FIG. 2, depicting the motor, first and second actuators, and the side frame members.

Reference is made to FIGS. 2 and 3, which respectively provide a side view and a front view of a flatbed trailer enclosure 100 according to the invention. The flatbed trailer enclosure 100 includes upright frame members 102 (shown individually as 102*a*, 102*b*, 102*c*, 102*d*); motors 104 (shown individually as 104*a*, 104*b*, 104*c*, 104*d*); pairs of actuators 106, 108 (shown individually as 106*a*, 106*b*, 106*c*, 106*d*, 108*a*,108*b*,108*c*, 108*d*); pairs of side frame members 110 (each pair shown individually as 111*a*,110*b*, 110*c*, 110*d*); and fabric panels 112 (shown individually as 112*a*, 112*b*, 112*c*, 112*d*) covering the side frame members 110. Each pair of side frame members 110 comprises a first side frame member 111*a* and a second side frame member 111*b*.

The upright frame members 102 are arranged along the length of a flatbed trailer 114. Each upright frame member 102 has an upper portion 116 and a lower portion 118 and is secured at the lower portion 118 to the top surface 120 of the flatbed trailer 114. Preferably, each motor 104, and each first and second actuators 106, 108 are secured to the upper portion 116 (FIG. 3) so as to minimize the risk of damage from forklifts or the trailer contents.

As shown in FIG. 3, the motor 104 is coupled to the input of a rotating drive shaft 122. In order that the flatbed trailer enclosure 100 can be used with existing flatbed trailers, it is preferable that the motor 104 comprise a DC motor which can be operated from a 12 volt truck battery. However, it will be understood that the motor 104 may also comprise an hydraulic motor, a gasoline motor, or a diesel motor, or may be replaced with a hand-operated crank.

The first and second actuators 106, 108 are coupled to the rotating drive shaft 122. The first actuator 106 has a first rotating output shaft 124*a* rotatably coupled to one side 126*a* of the upper portion 116 for rotating the first side frame member 111*a*. Similarly, the second actuator 108 has a second rotating output shaft 124*b* rotatably coupled to the other side 126*b* of the upper portion 116 for rotating the second side frame member 111*b*. As will be described, the first and second actuators 106, 108 are designed so that the first and second output shafts 124*a*, 124*b* always rotate at the same speed but in opposite directions.

Figure 4:
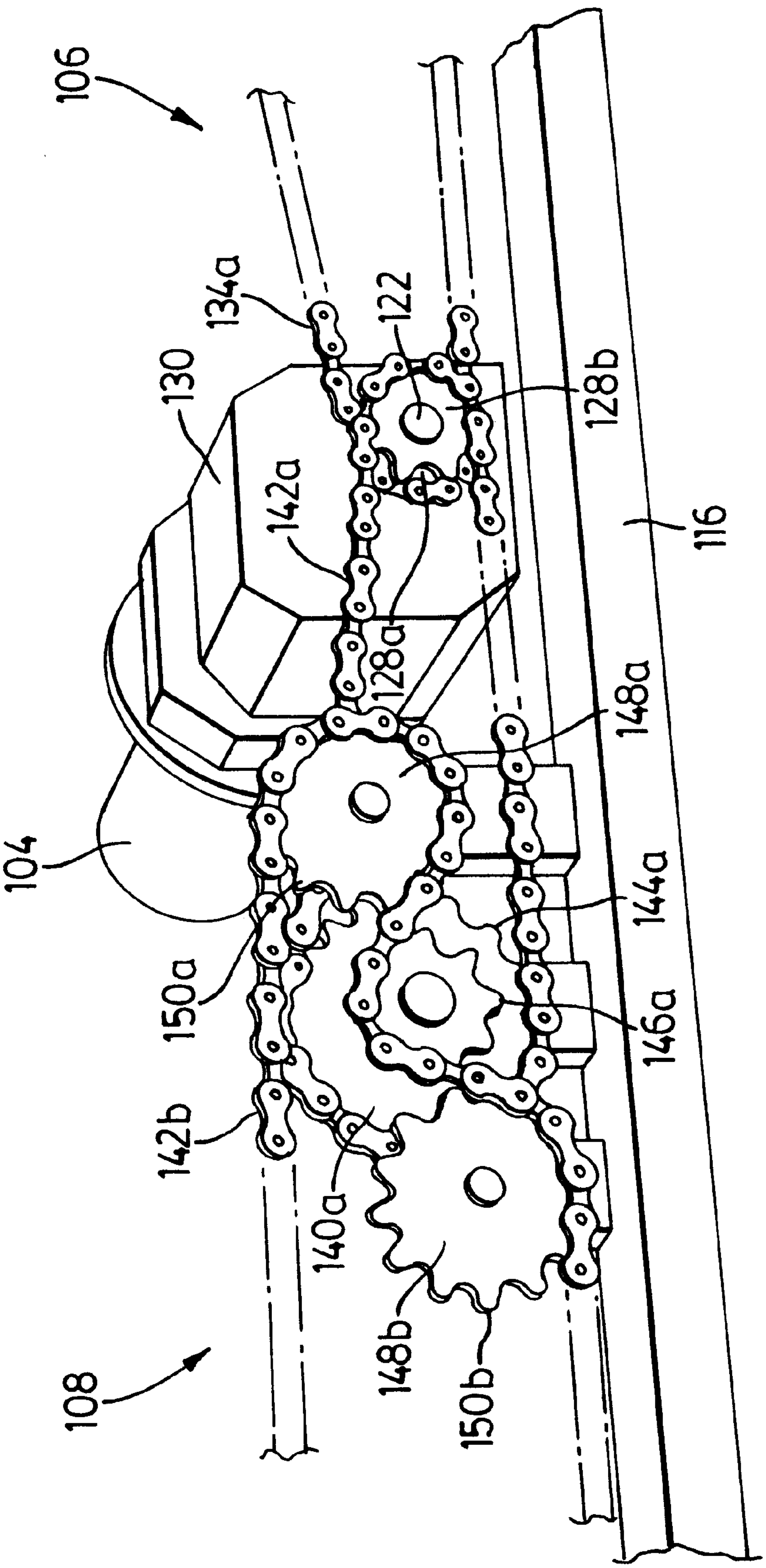
FIG. 4 is a magnified perspective view of the motor and a portion of one of the actuators.

The rotating drive shaft 122 is coupled to a drive gear 128 having a first drive sprocket 128*a* secured along a common face to a second drive sprocket 128*b* (FIG. 4). As will be discussed, it is preferable that the motor 104 is coupled to the input of the rotating drive shaft 122 through an inline gear box 130 (FIG. 4) which substantially increases the effective torque produced by the motor 104.

Reference is made to FIGS. 3 and 4 which show the first and second actuators 106, 108. The first actuator 106 comprises a first gear train which includes a series of gears 132 (shown individually as 132*a*, 132*b*, and 132*c*) and endless chains 134 (shown individually as 134*a*, 134*b*, and 134*c*). The first gear 132*a* includes a first sprocket 136*a* and a second sprocket 138*a* keyed to a common shaft. The first gear 132*a* has a series of teeth positioned around the circumference of the first sprocket 136*a*, and another series of teeth positioned around the circumference of the second sprocket 138*a*.

Similarly, the second gear 132*b* includes a first sprocket 136*b* and a second sprocket 138*b* keyed to a common shaft. The second gear 132*b* has a series of teeth positioned around the circumference of the first sprocket 136*b*, and another series of teeth positioned around the circumference of the second sprocket 138*b*.

The third gear 132*c* has a series of teeth 136*c* positioned around the circumference of the gear 132*c*, and is secured at a centre portion to the first output shaft 124*a*. The first gear 132*a* and the second gear 132*b* are rotatably coupled to the upper portion 116 of the upright frame member 102.

The first endless chain 134*a* is trained around the first drive sprocket 128*a* (FIG. 4) and the teeth of the first sprocket 136*a* of the first gear 132*a*. The second endless chain 134*b* is trained around the teeth of the second sprocket 138*a* of the first gear 132*a* and the teeth of the first sprocket 136*b* of the second gear 132*b*. The third endless chain 134*c* is trained around the teeth of the second sprocket 138*b* of the second gear 132*b* and the teeth 136*c* of the third gear 132*c*.

The second actuator 108 comprises a second gear train which includes a series of gears 140 (shown individually as 140*a*, 140*b*, and 140*c*), endless chains 142 (shown individually as 142*a*, 142*b*, and 142*c*), and a pair of take-up gears 148*a*,148*b*. The reversing gear 140*a* comprises a first sprocket 144*a* and a second sprocket 146*a* keyed to a common shaft. The first gear 140*a* has a series of teeth positioned around the circumference of the first sprocket 144*a*, and another series of teeth positioned around the circumference of the second sprocket 146*a*.

The first take-up gear 148*a* has a series of teeth 150*a* positioned around the circumference of the take-up gear 148*a*, and the second take-up gear 148*b* has a series of teeth 150*b* positioned around the circumference of the take-up gear 148*b*. Both the first and second take-up gears 148*a*, 148*b* are positioned in close proximity to the reversing gear 140*a*.

The second gear 140*b* includes a first sprocket 144*b* and a second sprocket 146*b* keyed to a common shaft. The second gear 140*b* has a series of teeth positioned around the circumference of the first sprocket 144*b*, and another series of teeth positioned around the circumference of the second sprocket 146*b*.

The third gear 140*c* has a series of teeth 144*c* positioned around the circumference of the gear 140*c*, and is secured at a centre portion to the second output shaft 124*b*. The first gear 140*a*, the second gear 140*b*, the first take-up gear 148*a*, and the second take-up gear 148*b* are rotatably coupled to the upper portion 116 of the upright frame member 102.

The first endless chain 142*a* is trained around the second drive sprocket 128*b* and the teeth of the first sprocket 144*a* of the reversing gear 140*a*. The second endless chain 142*b* is trained around the teeth of the second sprocket 146*a* of the reversing gear 140*a*, the teeth of the first sprocket 144*b* of the second gear 140*b*, the teeth 150*a* of the first take-up gear 148*a*, and the teeth 150*b* of the second take-up gear 148*b*. The third endless chain 142*c* is trained around the teeth of the second sprocket 146*b* of the second gear 140*b* and the teeth 144*c* of the third gear 140*c*.

Due to the path taken by the second endless chain 142*b* around the second sprocket 146*a* of the reversing gear 140*a*, the second output shaft 124*b* rotates in a direction opposite to that of the first output shaft 124*a*. This can be best understood with reference to FIG. 4. When the drive shaft 122 rotates in a clockwise direction, the first endless chain 134*a* of the first actuator 106 also rotates in a clockwise direction. As a result, each of the gears 132*a*, 132*b*, 132*c* of the first actuator 106 rotate in a clockwise direction, thereby causing the first output shaft 124*a* to rotate in a clockwise direction.

Similarly, the first endless chain 142*a* of the second actuator 108 rotates in a clockwise direction. However, the second endless chain 142*b* rotates in a counter-clockwise direction due to the orientation of the second endless chain 142*b* around the second sprocket 146*a*. As a result, each of the gears 144*b*,144*c* of the second actuator 108 rotate in a counter-clockwise direction, thereby causing the second output shaft 124*b* to rotate in a counter-clockwise direction. If the direction of rotation of the drive shaft 122 reverses, the direction of rotation of the first and second output shafts 124*a*, 124*b* also reverses, but the first output shaft 124*a* still rotates in a direction opposite to that of the second output shaft 124*b*.

As will be explained, to ensure that the sod is securely held on the flatbed trailer 114 between the side frame members 111, it is preferable that the first and second gear trains 106, 108 are reduction gears. In other words, it is preferable that the gear ratio of the first and second gear trains 106, 108 is at least 1:1. Therefore, it is advantageous if the diameter of each of the drive sprockets 128*a*,128*b* is less than the diameter of the first sprockets 136*a*, 144*a*. It is also advantageous if the diameter of each of the first sprockets 136*a*, 136*b*, 144*a*, 144*b* is greater than the diameter of the corresponding second sprockets 138*a*, 138*b*,146*a*, 146*b*, and the diameter of each of the second sprockets 138*b*, 146*b* is less than the diameter of the gears 132*c*, 140*c*. As a result, the torque of the motor 104 presented at the output shafts 124*a*, 124*b* will be increased by the gear ratio of the sprockets 128*a*, 136*a*, 138*a*, 136*b*, 138*b*, 132*c*, and by the gear ratio of the sprockets 128*b*, 144*a*, 146*a*, 144*b*, 146*b*, 140*c*.

In one implementation of the invention, the effective torque of the motor 104, measured at the drive shaft 122, is increased by a factor of 100 due to the gear ratio of the inline gear box 130. The first drive sprocket 128*a* has a total of 9 teeth positioned around its circumference. Each of the first sprockets 136*a*, 136*b*, and the third gear 132*c* have a total of 18 teeth positioned around their respective circumferences. Each of the second sprockets 138*a*, 138*b* have a total of 9 teeth positioned around their respective circumferences. As a result, each gear 132*a*, 132*b*, 132*c* reduces the effective speed of rotation of the motor 104 by half. Therefore, the gear ratio of the first gear train 106 is 8:1, and the magnitude of the torque produced at the output shaft 124*a* is 800 times the magnitude of the torque produced at the drive shaft 122.

To ensure that the output shafts 124*a*, 124*b* rotate at the same speed, it is preferable that the gear ratio of the sprockets 128*a*, 136*a*, 138*a*, 136*b*, 138*b*, 133*c* comprising the first gear train 132 is equal to the gear ratio of the sprockets 128*b*, 144*a*, 146*a*, 144*b*, 146*b*, 141*c* comprising the second gear train 140.

It will be appreciated that the gear trains 106, 108 may be replaced with actuators comprising a series of direct-coupled gears or flexible non-slipping belts trained around pulleys. If such alternate actuator means are used, as discussed above it is preferable that the sizes of the gears and pulleys are selected such that the velocity ratio of the actuators 106, 108 is at least 1:1, and the velocity ratio of the first actuator 106 is substantially equal to the velocity ratio of the second actuator 108.

Figure 5:
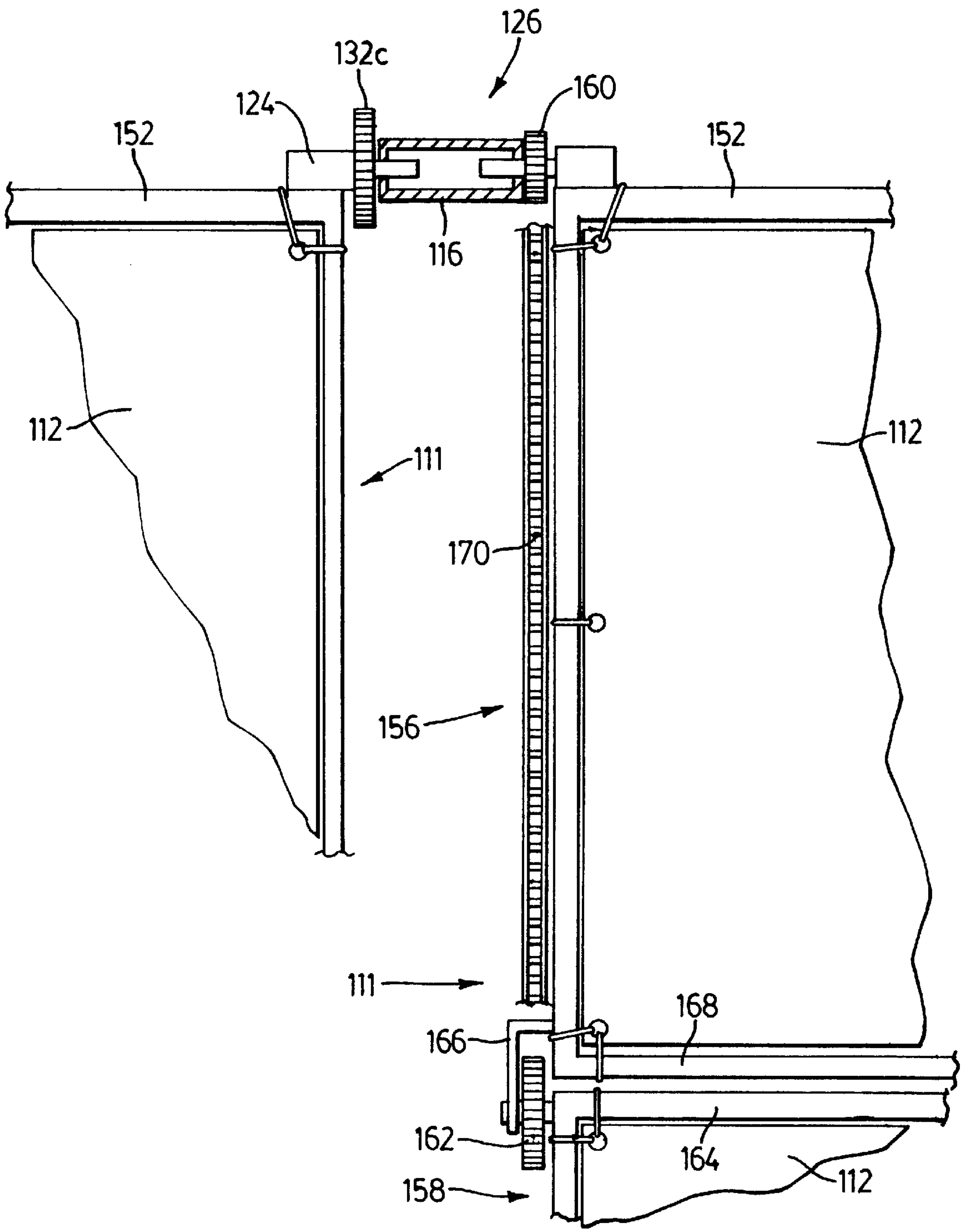
FIG. 5 is a sectional view taken along the line 5—5 of FIG. 3, depicting an output shaft of an actuator, and an upper and lower side frame.

Reference is made to FIG. 5, which shows a side frame member 111 of one pair of side frame members 110*a* longitudinally adjacent to a side frame member 111 of another pair of side frame members 110*b*. Each side frames, member 111 is coupled to a common upright frame member 102. Each side frame member 111 has an upper edge portion 152 which is secured at one end to a respective output shaft 124 and pivotally coupled at the other end to a respective side 126 of the upper portion 116 of an adjacent upright frame member 102. Each side frame member 111 may be of closed frame construction, namely having a panel member (not shown) extending between the upper edge portion 152 and the lower edge portion 154 (FIG. 2), and between each opposite end. However, it is preferable that each side frame member 111 is of open frame construction, namely having a fabric panel 112, such as a tarpaulin, secured to the side frame member 111. As will become apparent, a fabric panel 112 is advantageous because it reduces the load on the motor 104.

In another aspect, shown in FIG. 5, each side frame member 111 also comprises an upper frame 156 and a lower frame 158. An upper stationary sprocket 160 is secured against rotation to each side 126 of the upper portion 116, adjacent the upper edge portion 152. A lower sprocket 162 is secured against rotation to an end of the lower frame 158, adjacent the upper edge portion 164 of the lower frame 158. A bracket 166 is secured at one end to the lower edge portion 168 of the upper frame 156 and is pivotally coupled at the other end to the upper edge portion 164 so as to allow the lower frame 158 to rotate with respect to the upper frame 156 about an axis parallel to the lower edge portion 168.

Both the upper stationary sprocket 160 and the lower sprocket 162 have a series of teeth positioned around their respective circumferences. An endless chain 170 is trained around the teeth of the upper stationary sprocket 160 and the lower sprocket 162. As will be described, it is preferable that the velocity ratio of the gear train comprising the sprockets 160, 162 is approximately 3:2. In other words, it is preferable that the ratio of the diameter of the upper sprocket 160 to that of the lower stationary sprocket 162 is approximately 2:3.

Reference is now made to FIGS. 6–10 which show the flatbed trailer enclosure 100 in operation. For clarity of description, the motor 104 and the first and second actuators 106, 108 are not shown in FIGS. 6–10.

Figure 6:
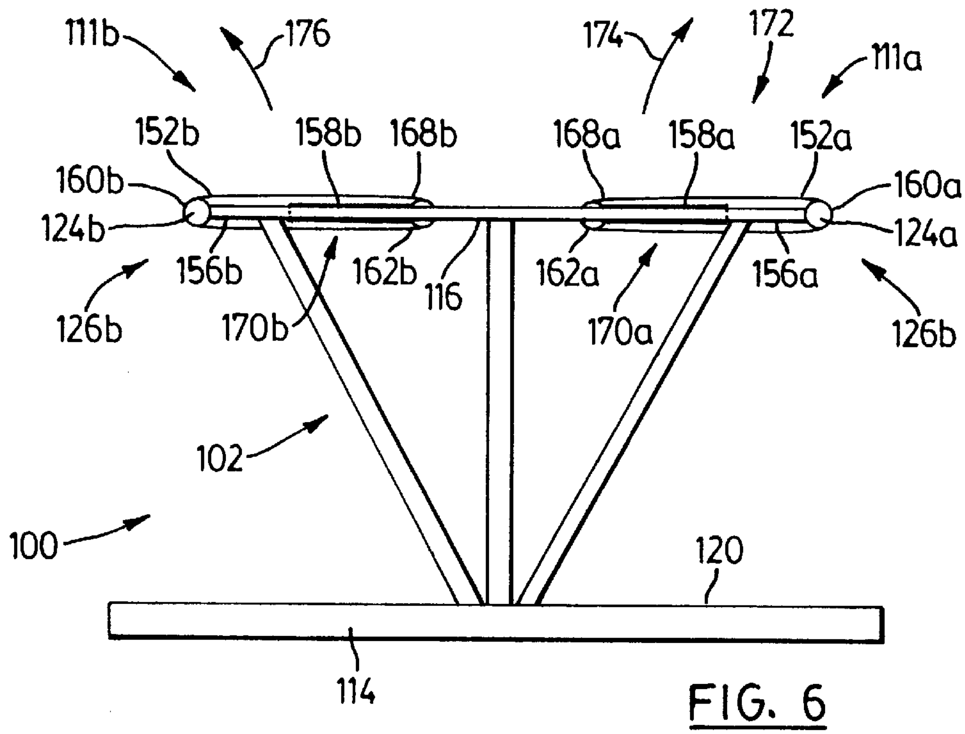
FIGS. 6 through 10 are schematic views taken along the line 3—3 of FIG. 2, depicting the side frame members as they rotate from an open position to a closed position.

Reference is made to FIG. 6 which shows the first and second side frame members 111*a*, 111*b* in the open position 172. In the open position 172, the upper frame 156*a* (comprising the first side frame member 111*a*) and the upper frame 156*b* (comprising the side frame member 111*b*) lie in a plane substantially parallel to the upper portion 116 and extend inwardly from the sides 126*a*, 126*b*, of the upright frame member 102. The lower frame 158*a* (comprising the first side frame member 111*a*) and the lower frame 158*b* (comprising the second side frame member 111*b*) also lie in a plane substantially parallel to the upper portion 116 but extend outwardly from the lower edge portions 168*a*, 168*b* of the upper frames 156*a*, 156*b*. When the side frame members 111*a*, 111*b* are in the open position 172, sod can be loaded onto the loading surface 120, such as by a forklift, without damaging the side frame members 111.

In order that the lower edge portions 168*a*, 168*b* of the upper frames 156*a*, 156*b* do not abut in the open position 172, it is preferable that the height of the upper frames 156*a*, 156*b*, namely the distance between the upper edge portions 152*a*, 152*b* and the lower edge portions 168*a*, 168*b*, is less than half the width of the upper portion 116 of the upright frame member 102.

After the sod has been loaded onto the loading surface 120, the motor 104 is activated, causing the drive shaft 122 (FIG. 3) to rotate in a clockwise direction. The clockwise rotation of the motor 104 causes the drive sprocket 128*a*; the endless chains 134*a*, 134*b*, 134*c*, and the gears 136*a*, 136*b*, 136*c* comprising the first actuator 106; and the first output shaft 124*a* to rotate in a clockwise direction (FIG. 3). As a result, the upper frame member 156*a* rotates in the direction of the arrow 174 about an axis parallel to the upper edge portion 152*a*.

At the same time, the drive sprocket 128*b*, and the endless chain 142*a* and the reversing gear 140*a* comprising the second actuator 108 also rotate in a clockwise direction (FIG. 3). However, as described above, the second sprocket 146*a* (FIG. 4) of the reversing gear 140*a* rotates the endless chains 142*b*, 142*c*, the gears 140*b*, 140*c*, and the output shaft 124*b* in a counter-clockwise direction. As a result, the upper frame member 156*b* rotates in the direction of the arrow 176 about an axis parallel to the upper edge portion 152*b*.

Figure 7:
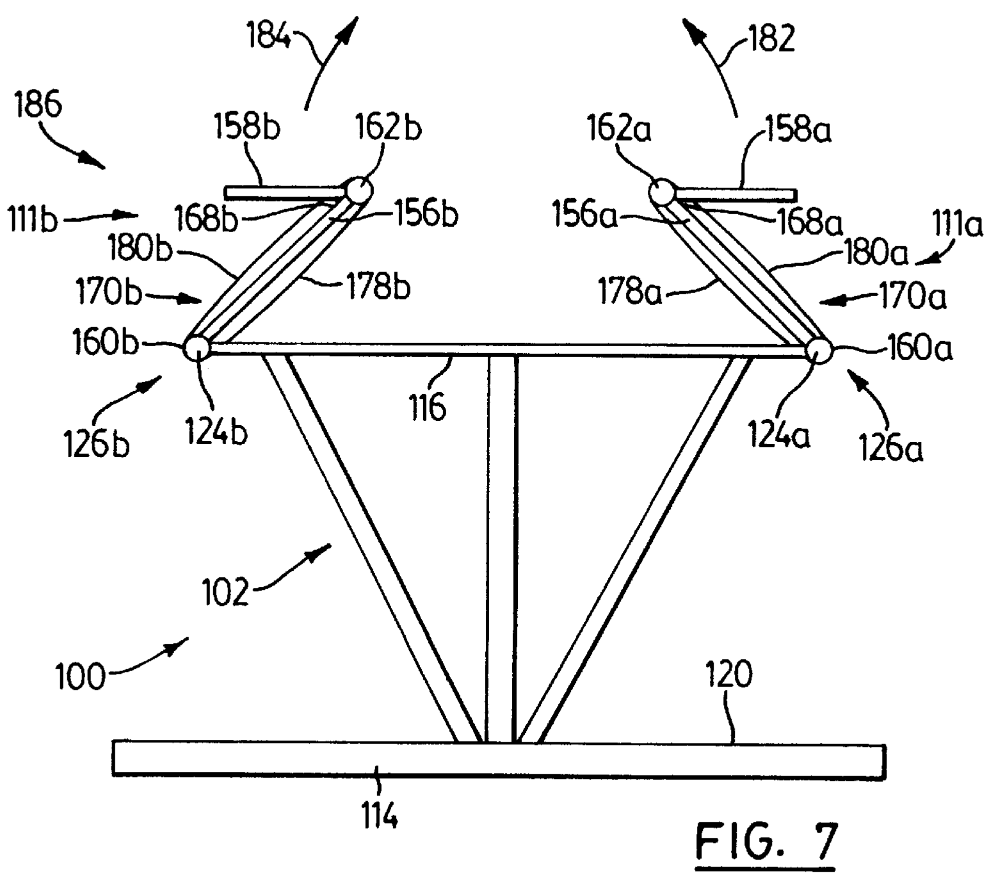
Figure 8:
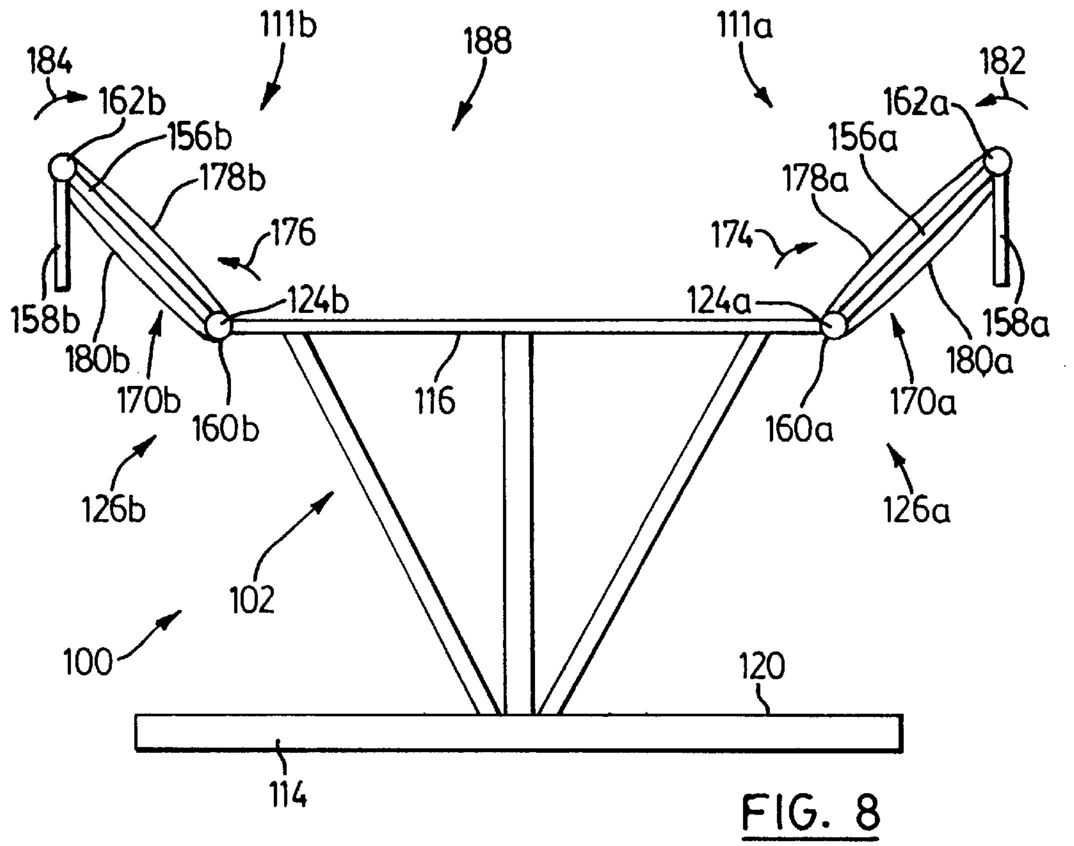
Figure 9:
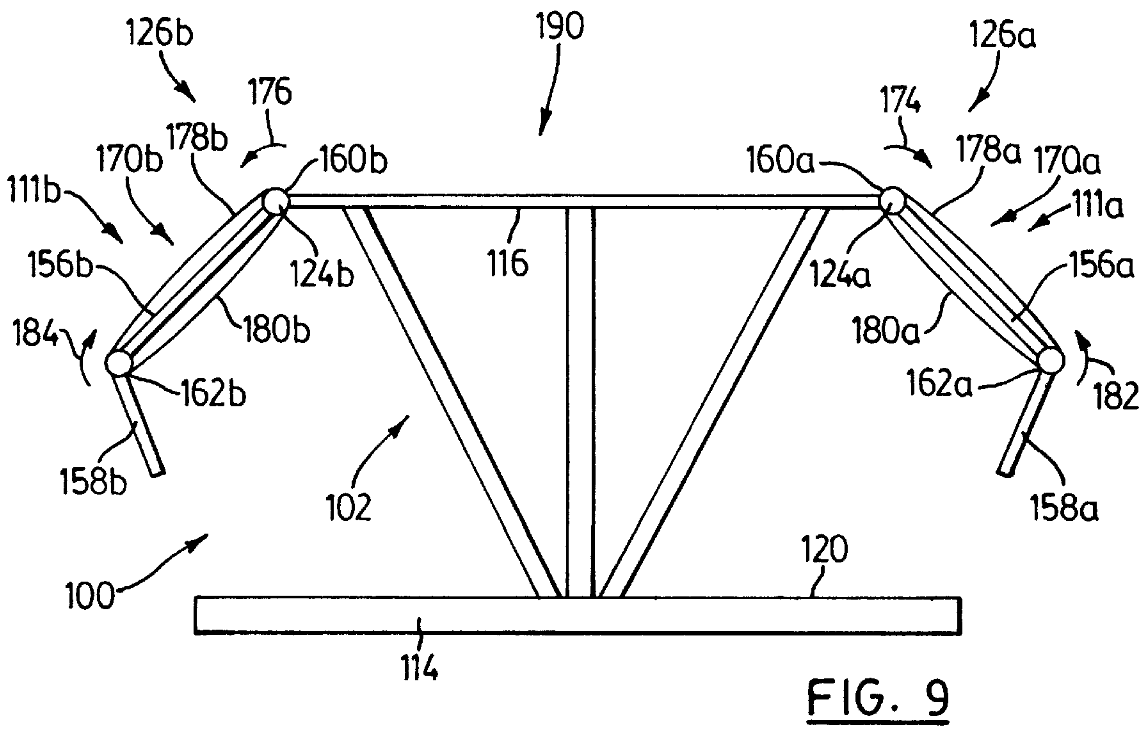

Reference is made to FIG. 7 which shows the first and second side frame members 111*a*, 111*b* in the first intermediate position 186. As the motor 104 continues to rotate the upper frame members 156*a*, 156*b* outwards, the lower sprocket 162*a* comprising the first side frame member lila rotates in orbital fashion around the upper stationary sprocket 160*a*. This orbital movement of the lower sprocket 162*a* causes the tension in the segment 178*a* of the endless chain 170*a* to increase, and the tension in the segment 180*a* of the endless chain 170*a* to decrease. As a result, the lower frame member 158*a* is urged to rotate outwardly in the direction of the arrow 182 about an axis parallel to the lower edge portion 168*a*.

Similarly, as the motor 104 rotates, the lower sprocket 162*b* comprising the second side frame member 111b rotates in orbital fashion around the upper stationary sprocket 160*b*, but in a direction opposite to that of the lower sprocket 162*a*. This orbital movement of the lower sprocket 162*b* causes the tension in the segment 178*b* of the endless chain 170*b* to increase, and the tension in the segment 180*b* of the endless chain 170*b* to decrease. As a result, the lower frame member 158*b* is urged to rotate outwardly in the direction of the arrow 184 about an axis parallel to the lower edge portion 168*b*.

Figure 10:
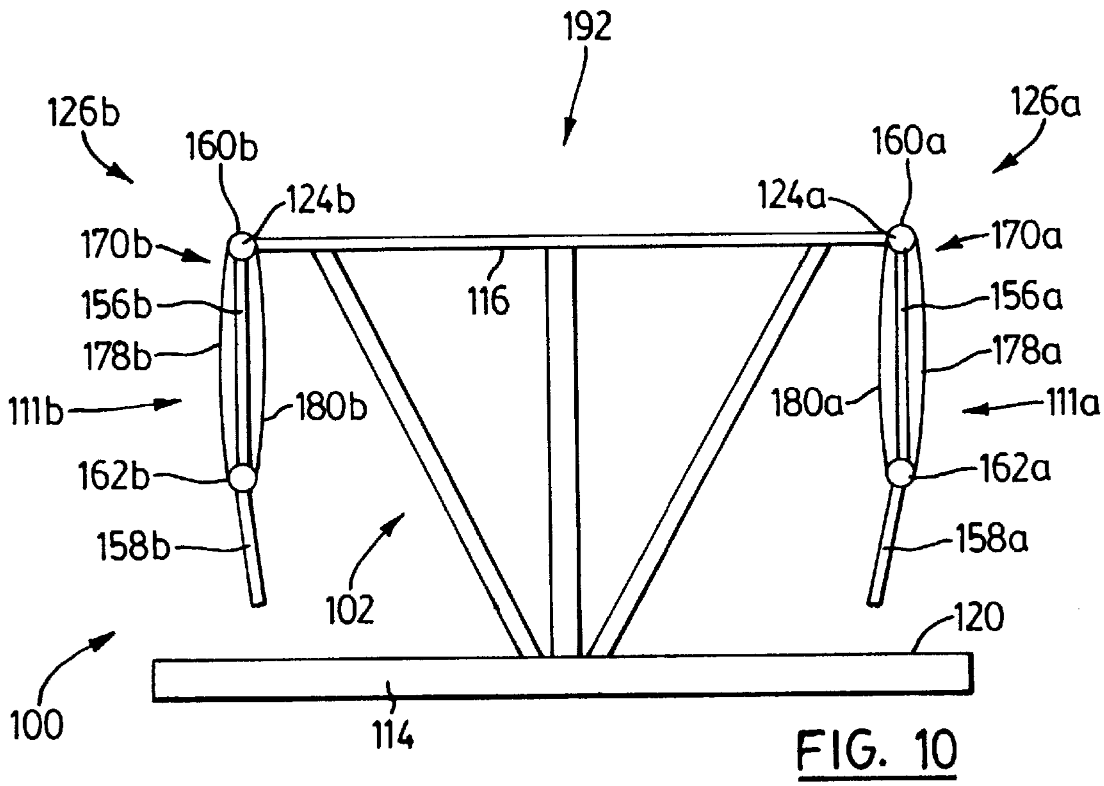

As the motor 104 continues to rotate, the first and second side frame members 111*a*, 111*b* rotate through the first, second and third intermediate positions 186 (FIG. 7), 188 (FIG. 8), 190 (FIG. 9) until they reach the closed position 192 (FIG. 10). When the side frame members 111*a*, 111*b* reach the closed position 192, power to the motor 104 is interrupted causing the motor 104 to stop.

Reference is made to FIG. 10 which shows the side frame members 111*a*, 111*b* in the closed position 192. In the closed position 192, the upper frames 156*a*, 156*b* and the lower frames 158*a*, 158*b* are substantially parallel to one another and lie in a plane substantially perpendicular to the upper portion 116. The upper frames 156*a*, 156*b* extend downwardly from the sides 124*a*, 124*b* of the upper portion 116, and the lower frames 158*a*, 158*b* extend downwardly from the lower edge portions 168*a*, 168*b* of the upper frames 156*a*, 158*b*. In the closed position 192, each side frame member 111 is in contact with a respective side of the sod pile so as to restrict lateral movement of the sod. By reversing the direction of rotation of the drive shaft 122, the side frame members 111*a*, 111*b* can be rotated from the closed position 192 back to the open position 172 and thereby allow the sod to be removed from the loading surface 120.

It will be apparent that when the side frame members 111*a*, 111*b* rotate from the closed position 172 to the open position 192, or vice versa, the upper frames 156*a*, 156*b* rotate through approximately $3\pi/2$ radians, and the lower frames 158*a*, 158*b* rotate through approximately $\pi$ radians. Therefore, it can be appreciated that to achieve the described orientation of the lower frames 158*a*, 158*b* with respect to the upper frames 156*a* 156*b*, it is preferable that the ratio of the diameter of the upper stationary sprockets 160*a*, 160*b* to that of the lower sprockets 162*a*, 162*b* is approximately 2:3.

Advantageously, when the side frame members 111*a*, 111*b* are in the closed position 192, the angle between the lower frames 158*a*, 158*b* and the upper frame 156*a*, 156*b* is slightly less than 180°. This ensures that each lower frame 158 tapers slightly inwards, causing each lower frame 158 to press firmly against a respective side of the sod pile when the side frame members 111*a*, 111*b* are in the closed position 192. Therefore, it is preferable that the ratio of the diameter of the upper stationary sprockets 160*a*, 160*b* to that of the lower sprockets 162*a*, 162*b* is at most 2:3. Satisfactory results have been obtained with upper stationary sprockets 160*a*, 160*b* having 12 teeth and lower sprockets 162*a*, 162*b* having 19 teeth.

It will be understood that the gear train comprising the sprockets 160, 162 may be replaced with an actuator comprising a series of direct-coupled gears or flexible non-slipping belts trained around pulleys.

It will be appreciated that the upper and lower frames 156, 158 could be replaced with multiple side frame portions. Multiple side frame portions would be particularly advantageous if the height of the upright frame members 102 is great in comparison to the width of the flatbed trailer 114.

It will also be appreciated that the output shafts 124 need not be positioned adjacent the sides 126 of the upper portion 116 but could be positioned inwardly from the sides 126. Similarly, the output shafts 124 need not be coupled to the ends of the side frame members 111, but could be coupled to any point on the side frame members 111, as long as the side frame members 111 were free to rotate between the open position 172 and the closed position 192.

It was mentioned above that it is preferable that the motor 104 is coupled to a torque-increasing inline gear box 130, and to gear trains 106, 108 comprising reduction gears. This characteristic is advantageous because if the torque of the motor 104 is multiplied by a torque-increasing gear box and reduction gears, a smaller, less expensive motor 104 is required to rotate the side frame members 111*a*, 111*b*. Another advantage of this characteristic is that it allows the side frame members 111 to resist large external lateral forces even with the motor 104 deactivated. This result is a consequence of the fact that any rotational force applied to the output shafts 124, when measured at the drive shaft 122, is reduced by the gear ratio of the inline gear box 130 and the gear ratio of the reduction gears comprising the gear trains 106, 108. As a result, when the side frame members 111 are rotated into the closed position 192 and the motor 104 is deactivated, any rotational force applied to the drive shaft 122 arising from the sod pile pressing against the side frame members 111 is greatly attenuated. Therefore, even with the motor 104 deactivated, the side frame members 111 resist lateral movement of the sod pile.

The description of the preferred embodiment is intended to be illustrative, rather than exhaustive, of the present invention. Those of ordinary skill will be able to make certain additions, deletions, and/or modifications to the embodiment disclosed without departing from the spirit or scope of the invention, as defined by the appended claims.

I claim:

1. A flatbed trailer enclosure comprising:

(a) an upright frame member having a lower portion adapted for securing to a top surface of a flatbed trailer;

(b) a pair of side frame members, each side frame member being pivotally mounted to said upright frame member;

(c) a drive shaft having a drive input;

(d) a first actuator for rotating one of said side frame members, said first actuator being coupled to said drive shaft and having an output shaft coupled to said side frame member; and (e) a second actuator for rotating the other of said side frame members, said second actuator having a reversing gear coupled to said drive shaft, and an output shaft coupled to said reversing gear and to said other side frame member.

2. The flatbed trailer enclosure of claim 1, wherein a velocity ratio of one of said actuators is at least 1:1.

3. The flatbed trailer enclosure of claim 1, wherein a velocity ratio of said first actuator is substantially equal to a velocity ratio of said second actuator.

4. The flatbed trailer enclosure of claim 1, wherein one of said actuators comprises a reduction gear coupled to said drive shaft.

5. The flatbed trailer enclosure of claim 4, wherein a gear ratio of said reduction gear is 8:1.

6. The flatbed trailer enclosure of claim 1, wherein said first actuator comprises a first gear train coupled to said drive shaft, and said second actuator comprises a second gear train coupled to said drive shaft, and wherein a gear ratio of said first gear train is substantially equal to a gear ratio of said second gear train.

7. The flatbed trailer enclosure of claim 1, wherein said drive shaft includes a drive sprocket, and one of said actuators comprises a plurality of sprockets and a plurality of endless chains trained around said drive sprocket and said plurality of sprockets.

8. The flatbed trailer enclosure of claim 7, wherein a gear ratio of said plurality of sprockets is at least 1:1.

9. The flatbed trailer enclosure of claim 8, wherein said gear ratio is 8:1.

10. The flatbed trailer enclosure of claim 1, characterized in that said rotating drive shaft includes a first drive sprocket and a second drive sprocket; said first actuator comprises a plurality of first sprockets and a plurality of first endless chains trained around said first drive sprocket and said plurality of first sprockets; and said second actuator comprises a plurality of second sprockets and a plurality of second endless chains trained around said second drive sprocket, said plurality of second sprockets, and said reversing gear; wherein a gear ratio of said plurality of first sprockets is substantially equal to a gear ratio of said plurality of second sprockets and said reversing gear.

11. The flatbed trailer enclosure of claim 1, wherein said drive shaft is coupled to said drive input through a gear box.

12. The flatbed trailer enclosure of claim 11, wherein said gear box is a torque-increasing gear box.

13. The flatbed trailer enclosure of claim 1, wherein said drive input is coupled to a motor.

14. The flatbed trailer enclosure of claim 13, wherein said motor is selected from the group comprising an electric motor, an hydraulic motor, a gasoline motor and a diesel motor.

15. The flatbed trailer enclosure of claim 1, wherein each of said output shafts is positioned adjacent a respective side of said upright frame member and is secured to a respective end of said side frame members.

16. The flatbed trailer enclosure of claim 1, wherein at least one of said side frame members comprises an upper side frame, a lower side frame, and a third actuator for rotating said lower side frame with respect to said upper side frame.

17. The flatbed trailer enclosure of claim 16, wherein a velocity ratio of said third actuator is at least 3:2.

18. The flatbed trailer enclosure of claim 16, wherein said third actuator comprises a first sprocket secured against rotation to said upright frame member, a second sprocket secured against rotation to said lower side frame, and an endless chain trained around said first sprocket and said second sprocket.

19. The flatbed trailer enclosure of claim 18, wherein said first sprocket has a first diameter and said second sprocket has a second diameter, and a ratio of said first diameter to said second diameter is at most 2:3.

20. The flatbed trailer enclosure of claim 19, wherein said ratio is 12:19.

21. The flatbed trailer enclosure of claim 1, further comprising a fabric panel secured to at least one of said side frame members.

22. The flatbed trailer enclosure of claim 21, wherein said fabric panel comprises a tarpaulin.

* * * * *